United States Patent
Cooper et al.

(10) Patent No.: US 10,177,601 B2
(45) Date of Patent: Jan. 8, 2019

(54) SYSTEMS AND METHODS FOR WIRELESS POWER DISTRIBUTION ALLOCATION

(71) Applicant: Intel Corporation, Santa Clara, CA (US)

(72) Inventors: Emily B. Cooper, San Francisco, CA (US); Siva Ramakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 15/007,989

(22) Filed: Jan. 27, 2016

(65) Prior Publication Data

US 2016/0149436 A1    May 26, 2016

Related U.S. Application Data

(63) Continuation of application No. 14/318,850, filed on Jun. 30, 2014.
(Continued)

(51) Int. Cl.
*H01F 27/42*    (2006.01)
*H01F 37/00*    (2006.01)
(Continued)

(52) U.S. Cl.
CPC ............ *H02J 50/12* (2016.02); *H02J 7/0021* (2013.01); *H02J 7/0027* (2013.01);
(Continued)

(58) Field of Classification Search
USPC ......................................... 307/104; 361/139
See application file for complete search history.

(56) References Cited

U.S. PATENT DOCUMENTS 9,787,365 B2 * 10/2017 Lee ..................... H02J 5/005
2007/0021140 A1    1/2007 Keyes, IV et al.
(Continued)

FOREIGN PATENT DOCUMENTS

CN    102082451 A    6/2011
CN    102917453       2/2013
(Continued)

OTHER PUBLICATIONS

Search Report and Official Letter from TW Application No. 105110283 completed Jul. 7, 2016 (7 pgs., including 1 pg. of translated Search Report).
(Continued)

*Primary Examiner* — Adam Houston
(74) *Attorney, Agent, or Firm* — Eversheds Sutherland (US) LLP (57) ABSTRACT

Systems and methods for power distribution allocation are provided. A system may establish a first wireless connection between the system and a first mobile device. The system may receive a first power request from the first mobile device, the first power request associated with a first minimum energy charge of the first mobile device, and may determine an available charging capacity of the charging system. The system may determine a first energy charge to provide wirelessly to the first mobile device, and may establish a second wireless connection with a second mobile device. The system may receive a second power request from the second mobile device, and may receive a first charge indicator from the first mobile device associated with a present charging status of the first mobile device. The system may determine a second energy charge to provide wirelessly to the second mobile device.

10 Claims, 4 Drawing Sheets

Related U.S. Application Data (60) Provisional application No. 61/953,498, filed on Mar. 14, 2014.

(51) Int. Cl.
  *H01F 38/00* (2006.01)
  *H02J 50/12* (2016.01)
  *H02J 7/00* (2006.01)
  *H02J 50/40* (2016.01)
  *H02J 50/20* (2016.01)
  *H02J 50/80* (2016.01)
  *H02J 1/14* (2006.01)
  *H02J 50/27* (2016.01)
  *H02J 50/23* (2016.01)

(52) U.S. Cl.
  CPC ............ *H02J 7/0063* (2013.01); *H02J 50/20* (2016.02); *H02J 50/40* (2016.02); *H02J 50/80* (2016.02); *H02J 1/14* (2013.01); *H02J 50/23* (2016.02); *H02J 50/27* (2016.02); *H02J 2007/0067* (2013.01); *H02J 2007/0096* (2013.01)

(56) References Cited

U.S. PATENT DOCUMENTS

| | | | |
|---|---|---|---|
| 2011/0043327 A1 | 2/2011 | Baarman et al. | |
| 2012/0091951 A1* | 4/2012 | Sohn | H02J 7/0047 320/108 |
| 2012/0149307 A1* | 6/2012 | Terada | H02J 7/025 455/66.1 |
| 2013/0002038 A1* | 1/2013 | Lee | H02J 7/00 307/104 |
| 2013/0035131 A1 | 2/2013 | Scholand et al. | |
| 2013/0063082 A1* | 3/2013 | Lee | H02J 7/025 320/108 |
| 2013/0127410 A1 | 5/2013 | Park et al. | |
| 2013/0214735 A1 | 8/2013 | Kang et al. | |
| 2013/0320760 A1 | 12/2013 | Kim et al. | |
| 2014/0113689 A1* | 4/2014 | Lee | H04W 52/0277 455/573 |
| 2014/0327409 A1* | 11/2014 | Lee | H02J 7/025 320/137 |
| 2015/0233990 A1* | 8/2015 | Lee | G01R 21/133 324/76.12 |
| 2015/0236757 A1* | 8/2015 | Lee | H04B 5/0037 320/108 |
| 2015/0365137 A1* | 12/2015 | Miller | H02J 5/005 307/104 |
| 2015/0372496 A1* | 12/2015 | Lee | H02J 50/60 307/104 |
| 2016/0087486 A1* | 3/2016 | Pogorelik | H02J 7/025 320/108 |
| 2016/0099604 A1* | 4/2016 | Von Novak, III | H02J 7/025 320/108 |
| 2016/0099609 A1* | 4/2016 | Leabman | H02J 50/40 307/104 |
| 2016/0132065 A1* | 5/2016 | Sultenfuss | G06F 1/3206 700/295 |
| 2016/0197494 A1* | 7/2016 | Kwon | H04B 5/0037 307/104 |
| 2016/0261142 A1* | 9/2016 | Park | H02J 50/40 |
| 2016/0294220 A1* | 10/2016 | Kwon | H02J 7/025 |
| 2016/0380467 A1* | 12/2016 | Shao | H02J 7/025 320/108 |
| 2017/0025857 A1* | 1/2017 | Matthews | H02J 50/40 |
| 2017/0093197 A1* | 3/2017 | Gao | H02J 7/025 |
| 2017/0179729 A1* | 6/2017 | Porat | H02J 50/12 |
| 2017/0324279 A1* | 11/2017 | Kang | H02J 50/80 |
| 2017/0331317 A1* | 11/2017 | Wheeland | H02J 50/80 |
| 2017/0366232 A1* | 12/2017 | Lee | H02J 50/12 |
| 2018/0138748 A1* | 5/2018 | Adolf | H02J 50/90 |
| 2018/0166905 A1* | 6/2018 | Park | H02J 7/02 |

FOREIGN PATENT DOCUMENTS

| | | |
|---|---|---|
| CN | 103597710 A | 2/2014 |
| TW | 201112568 A | 4/2011 |

OTHER PUBLICATIONS

First Office Action for Chinese Application No. 201580008486.6, dated Dec. 20, 2017, 8 pages (2 English Translation, 6 Chinese).
International Search Report and Written Opinion for PCT Application No. PCT/US2015/016049 dated Aug. 28, 2015.
Search Report for Taiwanese Patent Application No. 104103467 dated Dec. 16, 2015.
Office Action issued in Mexican Application No. MX/a/2016/010558, dated May 3, 2018 (7 pages, 3 pages of translation).
Office Action issued in Korean Application No. 2016-7022012, dated Jul. 25, 2018 (7 pages, 3 pages of translation).
Office action for Chinese Application No. 201580008486.6, dated Aug. 13, 2018, 18 pages (10 pages English, 8 pages Chinese).

\* cited by examiner

SYSTEMS AND METHODS FOR WIRELESS POWER DISTRIBUTION ALLOCATION

CROSS REFERENCE TO RELATED APPLICATIONS

This application claims the priority benefit of U.S. Provisional Application No. 61/953,498, entitled "Dynamic Power Transmission for Multiple Wireless Receivers," filed Mar. 14, 2014 and U.S. Nonprovisional application Ser. No. 14/318,850, entitled "Systems and Methods for Wireless Power Distribution Allocation" filed Jun. 30, 2014.

TECHNICAL FIELD

This disclosure generally relates to systems and methods for wireless power distribution, and more particularly to wireless power distribution allocation.

BACKGROUND

Mobile devices have become an integral part of the computing landscape. As mobile devices become more capable, they have shifted to perform tasks that have traditionally been performed by non-mobile computers. In one example, mobile devices may have the ability to stream media, display videos, or otherwise consume large amounts of data over the course of a day. The increasing use of mobile devices by consumers, along with a high dynamic range of power consumption across mobile devices, may cause strain on certain components of the mobile device, such as the battery or power source. In some instances, certain applications of mobile devices may consume large portions of the battery powering the mobile device, resulting in a frequent need to charge the mobile device. Charging systems, however, may not optimally charge mobile devices connected to the charging system. Accordingly, systems and methods of wireless power distribution allocation may be desired.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Example embodiments of the disclosure may provide systems and methods for power distribution allocation to mobile devices, such as, but not limited to, mobile communication devices, laptops, smartphones, tablets, wearables (including headsets, watches, health monitors, etc.), or other mobile devices. Example embodiments may include a first mobile device wirelessly connected to a charging system, such as a wireless charging system, and a second mobile device wirelessly connected to the charging system. The charging system may be configured to charge, or provide energy, wirelessly to the first and second mobile devices. For example, the charging system may implement or otherwise include magnetic resonance technology to wirelessly distribute or provide energy to the first and second mobile devices. Other forms of wirelessly providing energy may be utilized, examples of which are described herein. The charging system may provide energy to the connected mobile devices based at least in part on one or more power requests from each connected mobile device. However, the first and second mobile devices may have different energy needs based on many factors, for example, the charging cycle of the mobile device, the rate at which energy is being transferred, the capacity of the energy store (e.g., battery) of each mobile device, or other component limitations of each mobile device. Accordingly, each mobile device connected to the charging system may have dynamic power or energy needs.

According to certain example embodiments of the disclosure, the charging system may account for the dynamic power needs of connected mobile devices in order to optimize use of the charging capacity of the charging system. The charging system may provide power, calculated as energy over time, to connected mobile devices. For example, the mobile devices connected to the charging system may communicate their respective charging needs to the charging system, and the charging system may allocate or reallocate energy that is provided to the first and second mobile devices based on the methods and systems described herein, such that the overall charging capacity of the charging system is utilized and/or optimized. In some instances, the total charging time for all connected devices may be optimized or reduced. For example, the charging system may receive a minimum power request and, in some embodiments, a maximum power request from both the first and second mobile devices. The charging system may also receive a charge indicator from the first and second mobile devices. The charging system may provide energy to the first and second mobile devices based at least in part on the respective minimum or maximum power requests received from the mobile devices. In some instances, a third mobile device may establish a wireless connection with the charging system. The charging system may receive a minimum power request and, in some embodiments, a maximum power request from the third mobile device. The charging system may determine whether or not to provide energy, or how much energy to provide, to the third mobile device based at least in part on the energy being requested by and/or provided to the first and second mobile devices, the minimum power required of a third device, as well as the available charging capacity of the charging system. In some embodiments, the charging system may dynamically reallocate energy being provided to the first and second mobile devices in order to provide energy to the third mobile device. In other embodiments, the charging system may determine real-time energy being provided to, or being received or requested by, connected mobile devices in order to determine available charging capacity of the charging system. Additional systems and methods of power distribution allocation are described herein.

In example embodiments, the mobile devices discussed herein may have one or more antennas and/or transceivers, such as antennas and/or transceivers (e.g., radios), for wirelessly communicating with, for example, one another and/or the charging system. Sample forms of wireless communication may include WiFi, BLUETOOTH™, BLUETOOTH LE™, Near Field Communication, and other forms of wireless communication including non-radio frequency methods such as infrared radiation. In example embodiments, the mobile devices may be configured to wirelessly receive energy from the charging system. For example, the mobile devices may include resonators for engaging in a resonant magnetic induction energy transfer with the charging system.

It will be appreciated that in example embodiments, the systems and methods described herein may provide for and result in increased functionality for mobile devices, and/or optimal use of charging capacity for charging systems by utilizing unused capacity of the charging system to provide energy to connected mobile devices.

Figure 1:
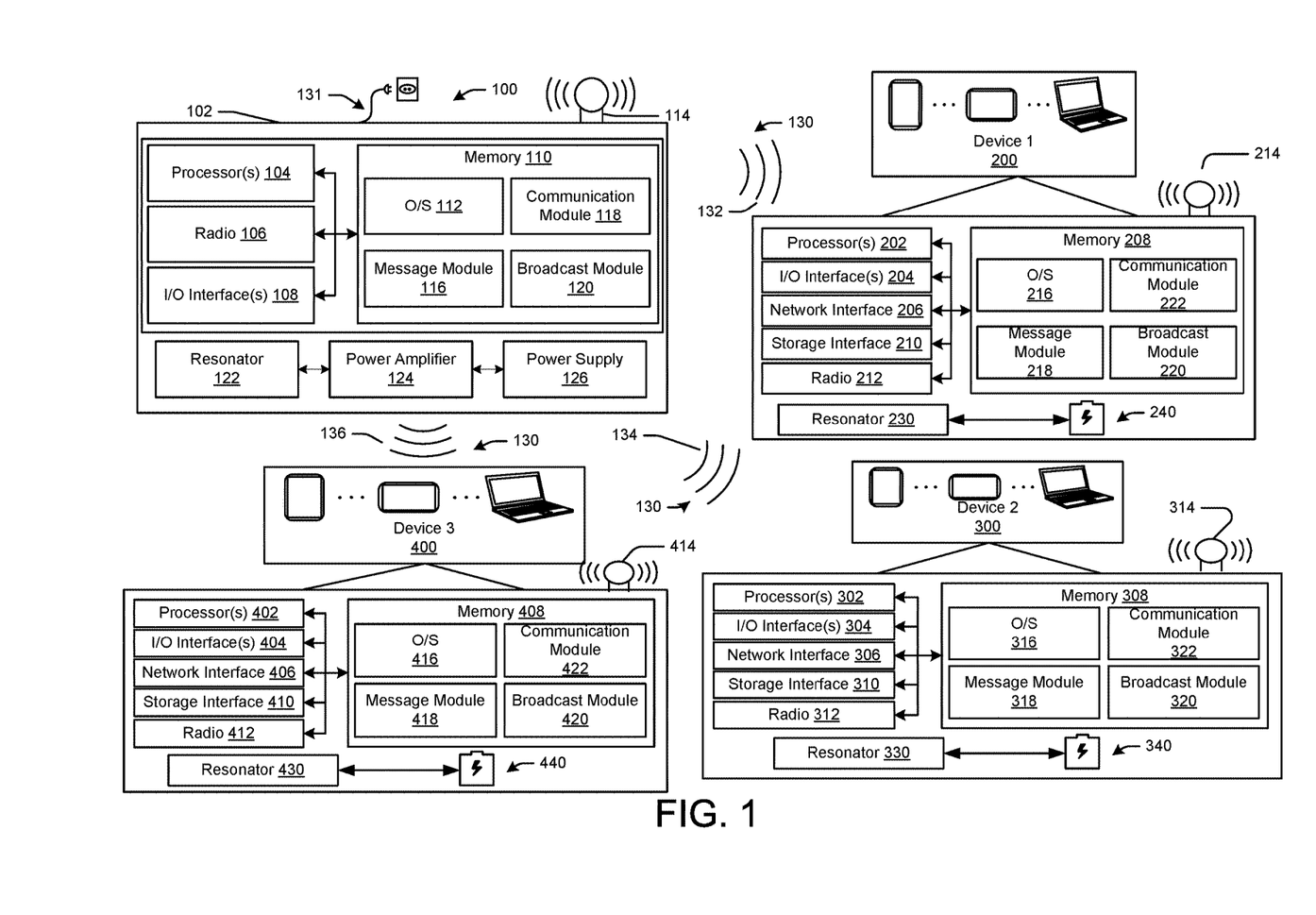
FIG. 1 is an illustrative schematic diagram of a wireless charging system, in accordance with example embodiments of the disclosure.

Some example elements involved in the operation of the systems, methods, and apparatus disclosed herein may be better understood with reference to the figures. Referring now to FIG. 1, FIG. 1 is a simplified schematic diagram illustrating an example charging system 100 in accordance with embodiments of the disclosure. In the illustrated embodiment, the charging system 100 includes a power transmission unit 102. FIG. 1 further depicts a first mobile device 200, a second mobile device 300, and a third mobile device 400. The embodiment is merely illustrative, as any number of mobile devices may be included. The first mobile device 200, the second mobile device 300, and the third mobile device 400 may be in wireless communication 130 with the power transmission unit 102 of the charging system 100. Specifically, the first mobile device 200 may be connected to the power transmission unit 102 via a first wireless connection 132. The second mobile device 300 may be connected to the power transmission unit 102 via a second wireless connection 134. The third mobile device 400 may be connected to the power transmission unit 102 via a third wireless connection 136. In other embodiments of the present disclosure, additional or fewer mobile devices and/or power transmission units may be included.

The power transmission unit 102 may be any one of suitable devices that may be configured to wirelessly provide energy to wirelessly connected mobile devices 200, 300, 400. In some embodiments, the power transmission unit 102 may incorporate an exemplary charging protocol, for example protocol established by the Alliance for Wireless Power (A4WP) standard. In the illustrated embodiment, the power transmission unit 102 includes one or more processor(s) 104, a radio 106, an input/output interface (I/O) 108, and a memory 110. Each component 104, 106, 108 may be communicatively coupled to the memory 110. The memory 110 includes an operating system 112, a message module 116, a communication module 118, and a broadcast module 120. The operating system (O/S) 112 may provide users with a guided user interface and/or may provide software logic used to control the power transmission unit 102. The message module 116 may be configured to provide messaging capabilities for the power transmission unit 102. The communication module 118 may be configured to transmit and receive communications from mobile devices, for example, in order to establish a wireless connection. The broadcast module 120 may be configured to emit beacons in some embodiments, for local or nearby mobile devices.

The power transmission unit 102 includes an antenna 114 in communication with at least the radio 106. The power transmission unit 102 also includes a resonator 122 that may be configured to wirelessly provide or distribute energy or power to connected mobile devices 200, 300, 400. The power transmission unit 102 may optionally include a power amplifier 124 and a power supply 126. The power transmission unit 102 may be connected to an external power source 131 from which the power transmission unit 102 receives energy. Although each of these components is shown in the illustrated embodiment, other embodiments may include additional or fewer components. For example, the power transmission unit 102 may include capacitive charging technology, contact ultrasound or non-contact ultrasound technology, infrared technology, or other wireless power distribution technologies. The power transmission unit 102 may come in any shape, size, or form. For example, the power transmission unit 102 may be in the form of, or include, a mat or a sheet, or may be integrated into furniture such as tables or desktops, walls, airplane seats, chairs, armrests, electronic devices such as laptops or computers, or other surfaces at which mobile devices are commonly placed.

The mobile devices 200, 300, 400 may be any one of suitable devices that may be configured to execute one or more applications, software, and/or instructions to provide one or more services to a user. The mobile devices 200, 300, 400, as used herein, may be any variety of client devices, electronic devices, communications devices, and/or other user devices. The mobile devices 200, 300, 400 may include, but are not limited to, tablet computing devices, electronic book (ebook) readers, netbook computers, Ultrabook™, notebook computers, laptop computers, desktop computers, watches or other wearables, health monitors, personal digital assistants (PDA), smart phones, web-enabled televisions, video game consoles, set top boxes (STB), or the like. Further examples of mobile devices 200, 300, 400 include peripherals such as wireless keyboards, mouse components, and the like, as well as wearables including, but not limited to, headsets, health monitors, watches, wristbands, ear phones, and the like. While the drawings and/or specification may portray the mobile devices 200, 300, 400 in the likeness of a smartphone, a laptop, or a tablet, the disclosure is not limited to such. Indeed, the systems and methods described herein may apply to any mobile device or user device capable of communicating with and receiving energy from the power transmission unit 102 of the charging system 100. The mobile devices may be used by users for a variety of purposes, including, but not limited to, functionality such as web browsing, business, communications, graphics, word processing, publishing, spreadsheets, databases, gaming, education, entertainment, media, project planning, engineering, drawing, or combinations thereof.

In the illustrated embodiment, the first mobile device 200 includes one or more processor(s) 202, an input/output interface (I/O) 204, a network interface 206, a memory 208, a storage interface 210, and a radio 212. Each component 202, 204, 206, 210, 212 may be communicatively coupled to the memory 208. The first mobile device 200 further includes an antenna 214 in communication with at least the radio 212. The memory 208 includes an operating system (0/S) 216, a message module 218, a broadcast module 220, and a communication module 222. The operating system 216 may provide users with a guided user interface and/or may provide software logic used to control the mobile device 200. The message module 218 may be configured to provide messaging capabilities for the mobile device 200. The communication module 222 may be configured to transmit and receive communications from the charging system 100, for example, in order to establish a wireless connection. The broadcast module 220 may be configured to emit beacons in some embodiments, for local or nearby charging systems. The first mobile device 200 may also include a resonator 230 and a battery 240, where the resonator 230, in the illustrated embodiment, is configured to receive resonant magnetic inductive energy wirelessly from the power transmission unit 102 of the charging system 100 and to charge the battery 240, as described herein. Although each of these components is shown in the illustrated embodiment, other embodiments may include additional or fewer components. In other embodiments, the mobile device 200 may include components necessary to receive and store other forms of wirelessly communicated energy, such as capacitive charging.

Similarly, the second mobile device 300 includes one or more processor(s) 302, an input/output interface (I/O) 304, a network interface 306, a memory 308, a storage interface 310, and a radio 312. Each component 302, 304, 306, 310, 312 may be communicatively coupled to the memory 308. The second mobile device 300 further includes an antenna 314 in communication with at least the radio 312. The memory 308 includes an operating system (0/S) 316, a message module 318, a broadcast module 320, and a communication module 322. The operating system 316 may provide users with a guided user interface and/or may provide software logic used to control the mobile device 300. The message module 318 may be configured to provide messaging capabilities for the mobile device 300. The communication module 322 may be configured to transmit and receive communications from the charging system 100, for example, in order to establish a wireless connection. The broadcast module 320 may be configured to emit beacons in some embodiments, for local or nearby charging systems. The second mobile device 300 may also include a resonator 330 and a battery 340, where the resonator 330 is configured to receive energy wirelessly from the power transmission unit 102 of the charging system 100 and to charge the battery 340, as described herein. Although each of these components is shown in the illustrated embodiment, other embodiments may include additional or fewer components. In other embodiments, the second mobile device 300 may include components necessary to receive and store other forms of wirelessly communicated energy, such as capacitive charging.

The third mobile device 400 also includes one or more processor(s) 402, an input/output interface (I/O) 404, a network interface 406, a memory 408, a storage interface 410, and a radio 412. Each component 402, 404, 406, 410, 412 may be communicatively coupled to the memory 408. The third mobile device 400 further includes an antenna 414 in communication with at least the radio 412. The memory 408 includes an operating system (0/S) 416, a message module 418, a broadcast module 420, and a communication module 422. The operating system 416 may provide users with a guided user interface and/or may provide software logic used to control the mobile device 400. The message module 418 may be configured to provide messaging capabilities for the mobile device 400. The communication module 422 may be configured to transmit and receive communications from the charging system 100, for example, in order to establish a wireless connection. The broadcast module 420 may be configured to emit beacons in some embodiments, for local or nearby charging systems. The third mobile device 400 may also include a resonator 430 and a battery 440, where the resonator 430 is configured to receive energy wirelessly from the charging system 100 and to charge the battery 440, as described herein. Although each of these components is shown in the illustrated embodiment, other embodiments may include additional or fewer components. In other embodiments, the third mobile device 400 may include components necessary to receive and store other forms of wirelessly communicated energy, such as capacitive charging.

Each respective processor 104, 202, 302, 402 of the power transmission unit 102 or the mobile devices 200, 300, 400 may be implemented as appropriate in hardware, software, firmware, or combinations thereof. Software or firmware implementations of the processors 104, 202, 302, 402 may include computer-executable or machine-executable instructions written in any suitable programming language to perform the various functions described. Hardware implementations of the processors 104, 202, 302, 402 may be configured to execute computer-executable or machine-executable instructions to perform the various functions described. The processors 104, 202, 302, 402 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The power transmission unit 102 and/or mobile devices 200, 300, 400 may also include a chipset (not shown) for controlling communications between one or more processors 104, 202, 302, 402 and one or more of the other components of the power transmission unit 102 or the mobile devices 200, 300, 400. The processors 104, 202, 302, 402 may also include one or more application specific integrated circuits (ASICs) or application specific standard products (ASSPs) for handling specific data processing functions or tasks. In certain example embodiments, the power transmission unit 102 and/or the mobile devices 200, 300, 400 may be based on an Intel® Architecture system, and the processors 104, 202, 302, 402 and chipset may be from a family of Intel® processors and chipsets, such as the Intel® Atom® processor family.

The input/output interfaces 108, 204, 304, 404 included in the power transmission unit 102 and the mobile devices 200, 300, 400 may enable the use of one or more user interfaces for receiving user input and/or providing output to the user. A user may be able to administer or manage the systems and methods disclosed herein by interacting with the power transmission unit 102 or the mobile devices 200, 300, 400 via the input/output interfaces 108, 204, 304, 404, such as a touchscreen interface, a display, a guided user interface, or any other input/output interface. The input/output interfaces 108, 204, 304, 404 may be in the form of a touch screen, a microphone, an accelerometer sensor, a speaker, or any other suitable input/output interfaces that may be used by the user to interact with the power transmission unit 102 or the mobile devices 200, 300, 400.

The memory 110 of the power transmission unit 102, as well as the memory 208, 308, 408, of the first mobile device 200, second mobile device 300, and third mobile device 400, respectively, may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 110 of the power transmission unit 102, as well as the memory 208, 308, 408, of the first mobile device 200, second mobile device 300, and third mobile device 400, respectively, may store program instructions that are loadable and executable on each respective processor 104, 202, 302, 402, as well as data generated or received during the execution of these programs. Turning to the contents of each memory 110, 208, 308, 408 in more detail, each memory 110, 208, 308, 408 may include several modules. Each of the modules and/or software may provide functionality for the power transmission unit 102 or mobile devices 200, 300, 400, when executed by the processors 104, 202, 302, 402. The modules and/or the software may or may not correspond to physical locations and/or addresses in each memory 110, 208, 308, 408. In other words, the contents of each of the modules may not be segregated from each other and may, in fact be stored in at least partially interleaved positions on each memory 110, 208, 308, 408.

The memory 110, 208, 308, 408 of the respective power transmission unit 102, first mobile device 200, second mobile device 300, and third mobile device 400 includes a respective operating system module 112, 216, 316, 416. The processors 104, 202, 302, 402 of the power transmission unit 102 or the corresponding mobile device 200, 300, 400 may each be configured to access and execute one or more operating systems stored in the respective operating system modules 112, 216, 316, 416 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The memory 110, 208, 308, 408 of the respective power transmission unit 102, first mobile device 200, second mobile device 300, and third mobile device 400 includes a respective broadcast module 120, 220, 320, 420. Each broadcast module 120, 220, 320, 420 may contain instructions and/or applications thereon that may be executed by each respective processor 104, 202, 302, 402 to provide one or more functionality associated with the directional distribution and reception of wireless signals and task processing. These instructions and/or applications may, in certain aspects, interact with each respective operating system module 112, 216, 316, 416 and/or other modules of the power transmission unit 102 and/or mobile devices 200, 300, 400. Each broadcast module 120, 220, 320, 420 may have instructions, software, and/or code stored thereon that may be launched and/or executed by the processors 104, 202, 302, 402 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The radios 106, 212, 312, 412 of the power transmission unit 102 and/or mobile devices 200, 300, 400 may be a transmit/receive component, such as a transceiver. The radios 106, 212, 312, 412 may include any suitable radio(s) and/or transceiver(s) for transmitting and/or receiving radio frequency (RF) signals in the bandwidth and/or channels corresponding to the communications protocols utilized by the mobile devices 200, 300, 400 to communicate with each other or with other user devices and/or the power transmission unit 102 or another component of the charging system 100. The radios 106, 212, 312, 412 may include hardware and/or software to modulate communications signals according to pre-established distribution protocols. The radios 106, 212, 312, 412 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radios 106, 212, 312, 412, in cooperation with their respective antennas 114, 214, 314, 414, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used for communications between the power transmission unit 102 and/or mobile devices 200, 300, 400, such as BLUETOOTH™, BLUETOOTH™ LE, Near Field Communication, dedicated short-range communication (DSRC), or other packetized radio communications. The radios 106, 212, 312, 412 may include any known receiver and baseband suitable for communicating via the communications protocols of the power transmission unit 102 and/or mobile devices 200, 300, 400. The radios 106, 212, 312, 412 may further include a low noise amplifier (LNA), additional signal amplifiers, an analog-to-digital (A/D) converter, one or more buffers, and a digital baseband.

The antennas 114, 214, 314, 414 included in the power transmission unit 102 and respective mobile devices 200, 300, 400 may be configured for receiving and/or transmitting communications signals from/to each other or other components of the charging system 100 directly or indirectly. The antennas 114, 214, 314, 414 may be any suitable type of antenna corresponding to the communications protocols used by the power transmission unit 102 and/or mobile devices 200, 300, 400 for the particular signals received and/or transmitted via the antennas 114, 214, 314, 414. Some non-limiting examples of suitable antennas 114, 214, 314, 414 include directional antennas, non-directional antennas, dipole antennas, folded dipole antennas, patch antennas, multiple-input multiple-output (MIMO) antennas, or the like. Each antenna 114, 214, 314, 414 may be communicatively coupled to a radio component to transmit and/or receive signals, such as communications signals to and/or from the power transmission unit 102 and/or the mobile devices 200, 300, 400.

The antennas 114, 214, 314, 414 may be configured to receive and/or transmit signals in accordance with established standards and protocols, such as the Institute of Electrical and Electronics Engineers (IEEE) 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antennas 114, 214, 314, 414 may be configured to receive and/or transmit non-Wi-Fi protocol signals, such as BLUETOOTH™, BLUETOOTH™ LE, Near Field Communication, dedicated short-range communication (DSRC), or other packetized radio communications.

Each mobile device 200, 300, 400 includes an energy storage device, such as a battery 240, 340, 440. Each battery 240, 340, 440 may be configured to provide energy or otherwise power each respective mobile device 200, 300, 400. The batteries 240, 340, 440 may be any suitable type of battery including, but not limited to, wet cells, dry cells, lead-acid, lithium, lithium hydride, lithium ion, or the like, at any suitable voltage and/or output current. In certain embodiments, the batteries 240, 340, 440 may be rechargeable and may be recharged by one or more other power sources, such as the power transmission unit 102.

The power transmission unit 102 and each mobile device 200, 300, 400 may include the respective resonator 122, 230, 330, 430. Each resonator 122, 230, 330, 430 may be any suitable resonator configured to provide, distribute, transmit, or receive energy. For example, the resonator 122 of the power transmission unit 102 may be configured to transmit energy wirelessly, and the resonators 230, 330, 430 of the mobile devices 200, 300, 400 may be configured to receive the energy transmitted by the resonator 122 of the power transmission unit 102. The resonators 122, 230, 330, 430 may be electromagnetic resonators in one example. The resonators 230, 330, 430 of the mobile devices 200, 300, 400 may be electrically coupled to each respective battery 240, 340, 440 of the mobile devices 200, 300, 400, and may be configured to charge, recharge, and/or provide energy to the batteries 240, 340, 440.

The power transmission unit 102 may include the power amplifier 124 and the power supply 126. The power amplifier 124 and the power supply 126 may be electrically coupled to the resonator 122 of the power transmission unit 102, and may energize the resonator 122 such that the resonator 122 may wirelessly transmit energy. The power supply 126 may be a battery, for example, and/or may be a connection to external power source 131. The power supply 126 may further include AC/DC power conversion capabilities and/or converters. The external power source 131 may be power provided from a power outlet, as shown. The connection between the power transmission unit 102 and the external power supply 130 may be a standard wall outlet, a Universal Serial Bus connection, a FIREWIRE™ or LIGHTNING™ connection, or any other connection configured to deliver power to the power transmission unit. In some embodiments, the power supply 126 may be an intermediary between the power transmission unit 102 and the external power supply 130. The power amplifier 124 may amplify energy from the power supply 126 to ensure the resonator 122 has sufficient energy to wirelessly transmit or distribute energy. For example, the power amplifier 124 may provide current in order to generate flux, thereby inducing voltage at the resonator 122.

Figure 2:
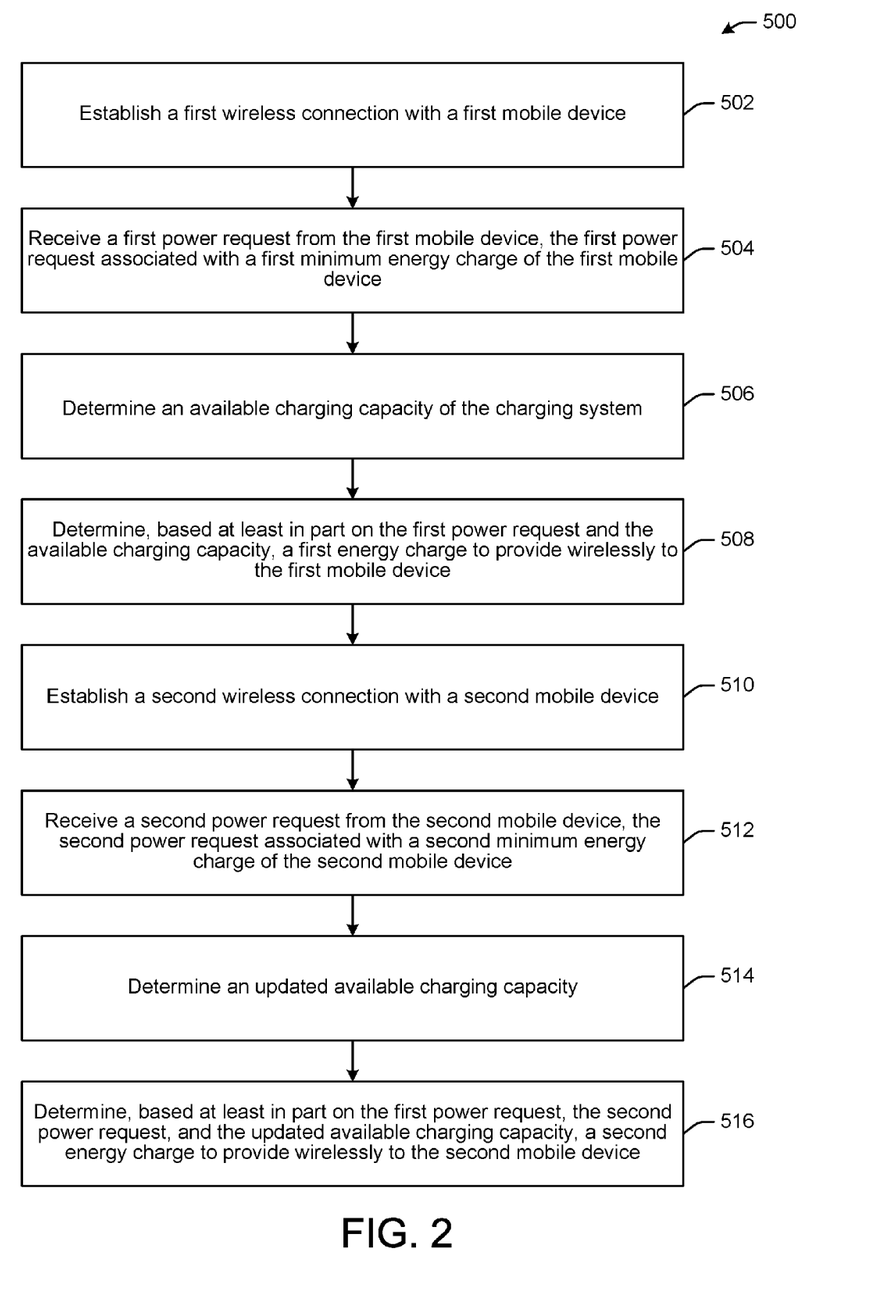
FIG. 2 is a flow diagram illustrating an example method for power distribution allocation, in accordance with certain example embodiments of the disclosure.
Figure 3:
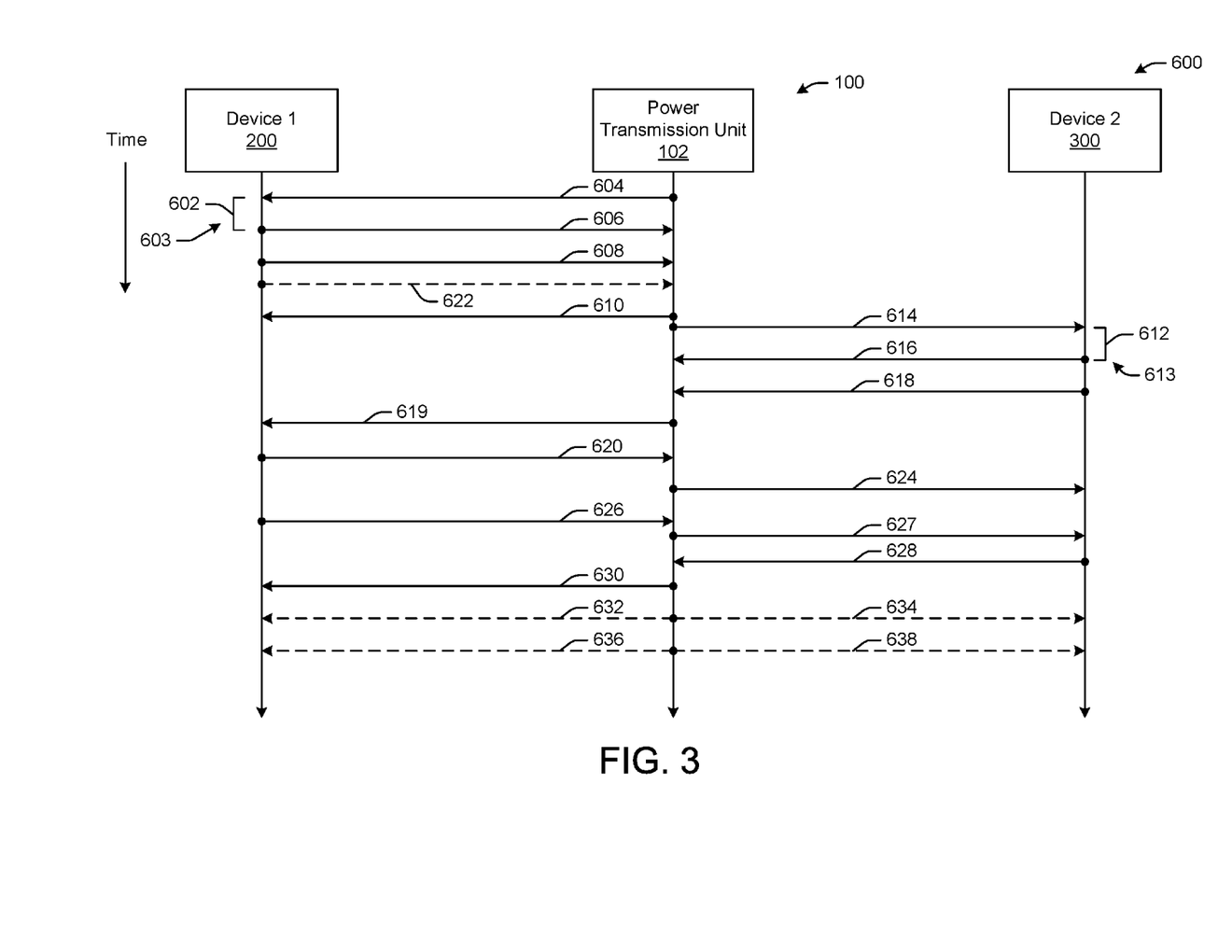
FIG. 3 is a dataflow diagram illustrating an example dataflow for the method of FIG. 2, in accordance with certain example embodiments of the disclosure.

Referring now to FIGS. 2 and 3, an example method 500 and an example data flow 600 for power distribution allocation according to one embodiment of the disclosure are illustrated and will be discussed in conjunction with each other. Referring first to FIG. 2, method 500 illustrates one example method for power distribution allocation, in accordance with one embodiment of the disclosure, that may be performed by a charging system having the features disclosed herein, for example the charging system 100. Referring now to FIG. 3, data flow 600 includes the first mobile device 200 in wireless communication via a first wireless connection 603 with the power transmission unit 102 of the charging system 100. Data flow 600 also includes the second mobile device 300 in wireless communication with the power transmission unit 102 of the charging system 100 via the second wireless connection 134. FIG. 3 illustrates data flowing between the components over time, denoted on the vertical axis.

Still referring to both FIGS. 2 and 3, at block 502 of FIG. 2, the charging system 100 may establish a first wireless connection between the charging system 100 and the first mobile device 200. The first wireless connection may be established by any of a number of methods. For example, turning to FIG. 3, one embodiment of block 502 is illustrated by the communications and/or operations included in exchange 602, where the first wireless connection 603 is established. As shown in FIG. 3, the first wireless connection 603 may be established between the power transmission unit 102 of the charging system 100 and the first mobile device 200. In the illustrated embodiment, at communication 604, the power transmission unit 102 may transmit a beacon, for example, to determine if any mobile devices within range want to connect to the power transmission unit 102. The beacon may be emitted or transmitted by the power transmission unit 102 periodically or at predetermined time intervals using any of the above described hardware and/or the communication module 118. The first mobile device 200 may receive the beacon from the power transmission unit 102 using any of the above described hardware, and in response, at communication 606, the first mobile device 200 may transmit a response or confirmation to the power transmission unit 102, thereby creating the first wireless connection 603 between the power transmission unit 102 and the first mobile device 200. Other methods of establishing wireless connections between the charging system 100 and mobile devices may be implemented. For example, a handshake or authentication process may be implemented. Further, any component of the charging system 100, including the power transmission unit 102 or any of the mobile devices 200, 300, 400 may initiate the respective wireless connections, and additional or fewer communications and/or operations may be performed in order to establish the first wireless connection 603.

At block 504 of FIG. 2, the charging system 100 may receive a first power request from the first mobile device 200, where the first power request is associated with a first minimum energy charge of the first mobile device 200, where the first minimum energy charge may be determined by the operating system 112. Referring to the data flow 600 of FIG. 3, this operation is shown at communication 608, where the first mobile device 200 may transmit the first power request to the power transmission unit 102. In one embodiment, transmission of the first power request may be initiated by the operating system 216 or the communication module 222 of the first mobile device 200. The first power request may indicate the minimum energy charge the first mobile device 200 will accept, and may be device dependent. For example, the first mobile device 200 may be unable to receive less than 1 watt of energy from the power transmission unit 102, and the first power request may reflect this minimum accordingly. In instances where the first mobile device 200 has a relatively larger power consumption or consumption rate, such as with a laptop computer, the first mobile device 200 may have a higher minimum power request than compared to instances where the first mobile device 200 consumes relatively little power, for example, a smartphone.

The power transmission unit 102 may receive the first power request via communication 608, and at block 506 of the method 500, the charging system 100 may determine an available charging capacity of the charging system 100. The available charging capacity may be a maximum charging output the charging system 100 is capable of providing, less any charge or energy currently being provided. For example, the charging system 100 may evaluate the overall total charging capacity or power output of the charging system 100, whether the charging system 100 is presently providing energy to any mobile devices, anticipated power requests from mobile devices (e.g., dependent on the charging cycle of the mobile device or additional power requests as discussed below) or other factors in determining the available charging capacity of the charging system 100. In some embodiments, the first mobile device 200 may optionally transmit, and the power transmission unit 102 may receive, a third power request associated with a first maximum energy charge, illustrated by dashed line 622, which may be associated with a maximum energy charge that can be requested and/or received by the first mobile device 200. Again, the third power request may be initiated by the operating system 216 and/or the communication module 222 of the first mobile device 200. The power transmission unit 102 may store any received power requests in memory 110 or otherwise catalog or create a registry to track the minimum and/or maximum energy charge for a given mobile device, as discussed herein.

Upon determining an available charging capacity of the charging system, or concurrently, at block 508 the charging system 100 may determine, based at least in part on the first power request and the available charging capacity, a first energy charge to provide wirelessly to the first mobile device 200, using for example the operating system 112. Operation 610 of FIG. 3 illustrates the power transmission unit 102 wirelessly providing the determined first energy charge to the first mobile device 200. As discussed herein, the rate at which energy is provided to the first mobile device 200 from the power transmission unit 102 may be determined by the power transmission unit 102 and may be based on the first power request received from the first mobile device 200. In some embodiments, the first energy charge may also be based in part on the third power request.

While the charging system 100 receives the first power request that is associated with a first minimum energy charge of the first mobile device 200, the charging system 100 may receive additional power requests from the first mobile device 200, although not illustrated. For example, the first power request may indicate the minimum energy charge the first mobile device 200 is willing to accept, but the actual energy charge desired by the first mobile device 200 may be higher. Accordingly, in some embodiments the charging system 100 may determine, using for example operating system 112, the first energy charge to provide to the first mobile device 200 based at least in part on the desired power requested by the first mobile device 200, as well as the first power request and the available charging capacity, and in some instances the third power request. Although illustrated as occurring at different points along the vertical time axis, any portion of any of the operations or steps described above may occur at least partially concurrently with any portion of any other operation or step described above.

At block 510, the charging system 100 may establish a second wireless connection between the charging system 100 and the second mobile device 300. For example, communications and/or operations 614, 616 included in exchange 612 of FIG. 3 may correspond to a beacon transmission sent by the power transmission unit 102 and received by the second mobile device 300 at communication 614, and in response, the second mobile device 300 may transmit a response or confirmation at communication 616 to the power transmission unit 102, thereby establishing a second wireless connection 613 between the power transmission unit 102 and the second mobile device 300. As discussed above, any method of establishing a wireless connection between the power transmission unit 102 and the second mobile device 300 may be implemented, and any device may initiate the wireless connection.

At block 512 of method 500 in FIG. 2, the charging system 100 may receive a second power request from the second mobile device 300, where the second power request is associated with a second minimum energy charge of the second mobile device 300. The second minimum energy charge may be device dependent, for example depending on the energy needs and consumption of the second mobile device 300, as discussed above with respect to the first power request. In FIG. 3, communication 618 illustrates the second mobile device 300 transmitting the second power request to the power transmission unit 102. The power transmission unit 102 may receive the second power request from the second mobile device 300 at communication 618.

Upon receiving the second power request from the second mobile device 300, the power transmission unit 102 may determine an updated available charging capacity of the charging system at block 514, where the updated available charging capacity may be determined or calculated, in one example by subtracting the first energy charge or a present energy charge allocated to the first mobile device 200 from the charging capability of the charging system 100, where the present energy charge is a realtime energy charge provided to the mobile device. The present energy charge being provided to the first mobile device 200 may correspond to the energy being provided to the first mobile device 200 from the power transmission unit 102 at the time the determination is made. In some instances, the present energy charge may be substantially equal to the first power request, or in other instances the present energy charge may be equal to the last received power request. However, as discussed above, the first mobile device 200 may not only transmit the first power request, corresponding to a minimum energy charge the first mobile device 200 will accept, but may transmit additional power requests, as part of the first power request or separately, that indicate a desired energy charge. Further, as the first mobile device 200 progresses on its respective charge cycle, for example from a constant-current position to a constant-voltage position in a constant-current/constant-voltage charge cycle, it may determine it desires an additional or reduced energy charge and/or rate of charge. For example, a smartphone may desire a slower rate of charge upon completing 80% of its charge cycle. Accordingly, at block 514, the charging system 100 determines a present energy charge being provided to the first mobile device 200 at the time the determination is made. In some embodiments, the charging system 100 may further determine a change in or request for change in the energy charge of the first mobile device 200. For example, the charging system 100 may request a charge indicator from the first mobile device 200 at communication 619, where the charge indicator is associated with, for example, a percentage charge completion, an estimated time to completion, a charge cycle indicator, or the like. The charging system 100 may receive at communication 620, in one example, the charge indicator from the first mobile device 200 indicating that the percentage charge completion of the first mobile device 200 is 79%. The charging system 100 may use the charge indicator to anticipate that the first mobile device 200 may desire or accept a reduced energy charge shortly (e.g., when the percentage charge completion is 80% or at a corresponding point on the charge cycle of the first mobile device 200), and may determine the present energy charge being provided to the first mobile device 200 accordingly.

At block 516, the charging system 100 may determine, based at least in part on the first power request, the second power request, and the updated available charging capacity, a second energy charge to provide wirelessly to the second mobile device 300. In some embodiments, the charging system 100 may also consider the third power request, associated with the first maximum energy charge of the first mobile device 200 in determining the second energy charge. In FIG. 3, operation 624 illustrates the power transmission unit 102 wirelessly providing energy to the second mobile device 300, thereby completing method 500. Although illustrated as occurring at different points along the vertical time axis, any portion of any of the operations or steps described above may occur at least partially concurrently with any portion of any other operation or step described above.

It should be noted, that the method 500 may be modified in various ways in accordance with certain embodiments of the disclosure. For example, one or more operations of method 500 may be eliminated or executed out of order in other embodiments of the disclosure. Additionally, other operations may be added to method 500 in accordance with other embodiments of the disclosure.

Referring still to FIG. 3, at communication 626 the first mobile device 200 may transmit a fifth power request to the power transmission unit 102, the fifth power request associated with an energy charge different than the first energy charge. For example, the fifth energy charge may be more or less than the first energy charge. For example, upon charge completion the fifth energy charge may be nothing. The power transmission unit 102 may receive the fifth energy charge and may determine an updated available charging capacity, as discussed above. In some instances, the power transmission unit 102 may request, at communication 627, a second charge indicator from the second mobile device 300, as discussed above with respect to the first charge indicator. The second mobile device 300 may receive the request and transmit, at communication 628, the second charge indicator to the power transmission unit 102. The power transmission unit 102 may determine, based at least in part on the fifth power request, the available charging capacity of the charging system 100, and/or the second charge indicator if requested and/or received, a fourth energy charge to provide to the first mobile device 200. At operation 630, the power transmission unit 102 may provide energy to the first mobile device 200 at the fourth energy charge.

At communications 632 and 634, the power transmission unit 102 of the charging system 100 may transmit a request for a charge indicator associated with a present charging status of any or all mobile devices 200, 300 wirelessly connected to the charging system 100. As discussed above, the charge indicator may include any of a percentage charge completion, an estimated time to completion, a charging cycle position indicator, or the like. The power transmission unit 102 may transmit such a request periodically, or requests may be triggered by certain actions, such as when a new mobile device wishes to connect to the power transmission unit 102 and/or receive energy charge from the power transmission unit 102. Communications 632 and 634 may occur at any point and at any time, although illustrated in an example position.

Similarly, the power transmission unit 102 may transmit requests, at communications 636 and 638, to any or all connected mobile devices 200, 300 for a received energy charge indicator. The received energy charge indicator may be associated with an energy charge that has been received by the respective mobile device while connected to the power transmission unit 102. For example, the received energy charge may indicate that the first mobile device 200 has been connected to the power transmission unit 102 for 1 hour and has received 1,000 milliampere-hours of energy charge. The power transmission unit 102 may receive respective energy charge indicators from connected mobile devices and analyze the energy charge indicator to the energy charge provided to the respective mobile device to determine an efficiency of the wireless charging provided by the power transmission unit 102. Based on the determined efficiency, the power transmission unit 102 may modify the energy charge being provided to the mobile device. For example, if the efficiency is low, the energy charge provided to that mobile device may be increased to compensate for the low efficiency. Communications 636 and 638 may occur at any point and at any time, although illustrated in an example position.

Figure 4:
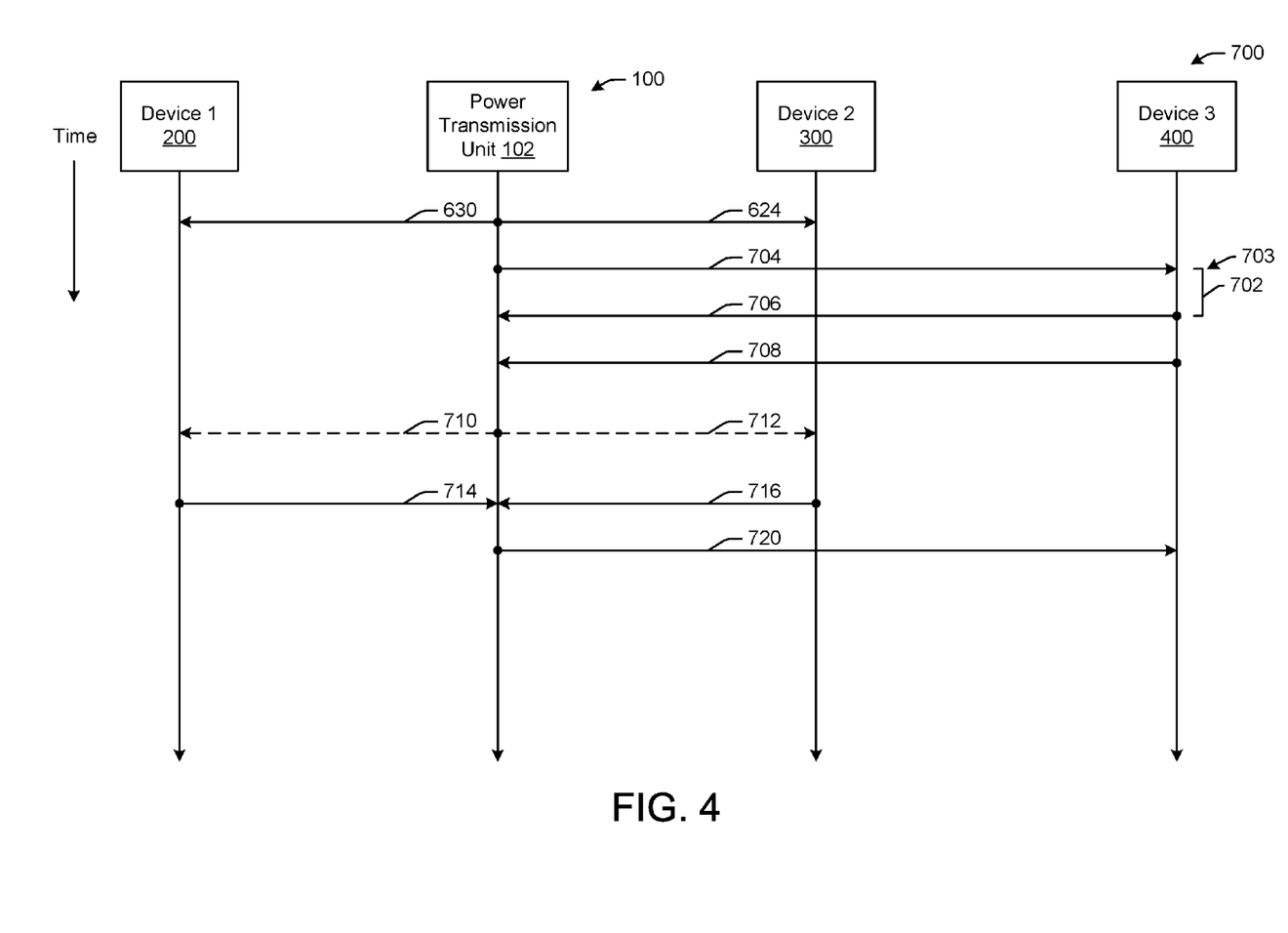
FIG. 4 is a dataflow diagram illustrating an alternative dataflow, in accordance with certain example embodiments of the disclosure.

Referring now to FIG. 4, an alternate embodiment of the disclosure is illustrated in dataflow 700. In this embodiment, a use case including the third mobile device 400 is depicted. At operation 630, the power transmission unit 102 may be wirelessly providing energy to the first mobile device 200, and at operation 624 the power transmission unit 102 may be wirelessly providing energy to the second mobile device 300, as described above with respect to FIG. 3. For example, the power transmission unit 102 may be able to provide a total of 20 watts of energy, for an initial available charging capacity of 20 watts. In this example, assume the first energy charge being provided to the first mobile device is 5 watts and the second energy charge being provided to the second mobile device 300 is 10 watts, leaving an available charging capacity of 5 watts. At exchange 702, the charging system 100 may establish a third wireless connection 603 between the power transmission unit 102 and the third mobile device 400. For instance, power transmission unit 102 may transmit a beacon at communication 704 that is received by the third mobile device 400. In response, the third mobile device 400 may transmit a response or confirmation to the power transmission unit 102 at communication 706, thereby establishing the third wireless connection 703. At communication 708, the third mobile device 400 may transmit a fourth power request to the power transmission unit 102, where the fourth power request is associated with a third minimum energy charge of the third mobile device 400, as discussed above with respect to the first and second minimum energy charges. Continuing the above example, assume the fourth power request is 5 watts. The power transmission unit 102 may receive the fourth power request from the third mobile device 400 and may determine a present energy charge being provided to the first mobile device 200 and the second mobile device 300. In some embodiments, the power transmission unit 102 may optionally transmit a charge indicator request, at communications 710 and 712, to the first and second mobile devices 200, 300, respectively. In response, the first mobile device 200 may transmit a charge indicator to the power transmission unit 102 at communication 714, and the second mobile device 300 may transmit a charge indicator to the power transmission unit 102 at communication 716.

The power transmission unit 102 may determine, based at least in part on the present energy charge allocated to the first mobile device 200, the second energy charge allocated to the second mobile device 300, the first minimum power of the first mobile device 200, the second minimum power of the second mobile device 300, the available charging capacity of the charging system 100, and the fourth power request from the third mobile device 400, a fourth energy charge to provide wirelessly to the third mobile device 400. At operation 720, the power transmission unit 102 may begin providing energy wirelessly to the third mobile device 400, in addition to providing energy to the first and second mobile devices 200, 300. Continuing the above example, because the power transmission unit 102 had an available capacity of 5 watts, sufficient to meet the minimum energy charge of the third mobile device 400, the power transmission unit 102 began providing energy to the third mobile device 400. If the third mobile device 400 had a minimum energy charge of 6 Watts, the power transmission unit 102 may have, in some embodiments, determined if the first or second energy charges could be reduced, based on the minimum energy charges for the first and second mobile devices 200, 300, and if so, the power transmission unit 102 may have reduced the energy charge to one or both of the first and second mobile devices 200, 300, based on the minimum energy charges for the first and second mobile devices 200, 300, to accommodate the minimum energy charge for the third mobile device 400.

In some embodiments, the charging system 100 may implement a priority order for adjusting the power or energy allocated to a specific connected mobile device, for example adjusting the first energy charge to the first mobile device 200 or the second energy charge to the second mobile device 300. For example, if the first mobile device 200 is a smart phone and the second mobile device 300 is a laptop computer, the charging system may allocate a higher percentage of desired energy charge to the smartphone than the percentage allocated to the laptop computer based on hardware or software logic. For example, the smartphone may charge more quickly than the laptop computer. In some embodiments, users may be able to set a priority order for charging, while in other embodiments, priority may be determined by estimated time to completion, charge cycle position, percentage charge completion, or other factors.

The systems and methods described herein may result in increased functionality or optimal power distribution allocation of charging systems by maximizing use of available capacity of the charging system. In some embodiments, the charging system may allocate power or energy to a mobile device based at least in part on a minimum energy charge requested by the mobile device, and may reallocate power or energy to the mobile device based at least in part on requests made by the device.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

According to example embodiments of the disclosure, there may be a method. The method may include establishing, by a charging system comprising one or more processors, a first wireless connection with a first mobile device, and receiving, by the charging system, a first power request from the first mobile device, the first power request associated with a first minimum energy charge of the first mobile device. The method may include determining, by the charging system, an available charging capacity of the charging system, determining, by the charging system and based at least in part on the first power request and the available charging capacity, a first energy charge to provide wirelessly to the first mobile device, and providing, by the charging system, energy wirelessly to the first mobile device. The method may include establishing, by the charging system, a second wireless connection with second mobile device, receiving, by the charging system, a second power request from the second mobile device, the second power request associated with a second minimum energy charge of the second mobile device, and determining, by the charging system, an updated available charging capacity of the charging system, based at least in part on the first energy charge. The method may include determining, by the charging system and based at least in part on the first power request, the second power request, and the updated available charging capacity, a second energy charge to provide wirelessly to the second mobile device, and providing, by the charging system, energy wirelessly to the second mobile device. In some examples, the method may include receiving, by the charging system, a third power request from the first mobile device, the third power request associated with a first maximum energy charge of the first mobile device, where the second energy charge provided wirelessly to the second mobile device is based at least in part on the first power request, the second power request, the updated available charging capacity, and the third power request.

The method may also include establishing, by the charging system, a third wireless connection with third mobile device, receiving, by the charging system, a fourth power request from the third mobile device, the fourth power request associated with a third minimum energy charge of the third mobile device, determining, by the charging system, an updated available charging capacity of the charging system, based at least in part on the first energy charge and the second energy charge, and determining, by the charging system and based at least in part on the first power request, the second power request, the updated available charging capacity, and the fourth power request, a third energy charge to provide wirelessly to the third mobile device. In some examples, the method may include receiving, by the charging system, a fifth power request from the first mobile device, wherein the fifth power request is associated with an energy charge different than the first energy charge, determining, by the charging system, an updated available charging capacity of the charging system, based at least in part on the first energy charge and the second energy charge, and determining, by the charging system and based at least in part on the fifth power request, and the updated available charging capacity, a fourth energy charge to provide wirelessly to the first mobile device. In some embodiments, the method may include requesting, by the charging system, a received energy charge indicator from any mobile device wirelessly connected to the charging system, the received energy charge indicator associated with energy charge received by the mobile device from the charging system, wherein either the first energy charge or the second energy charge is based at least in part on received energy charge indicators received by the charging system. In some embodiments, the method may include transmitting, by the charging system, a request for a charge indicator to any mobile device wirelessly connected to the charging system, the charge indicator comprising one of: a percentage charge completion, an estimated time to charge completion, or a charge cycle indication, where the request for the charge indicator is transmitted by the charging system periodically at predetermined time intervals, and adjusting one of the first energy charge or the second energy charge based at least in part on charge indicators received by the charging system. The method may include determining, by the charging system, a first present energy charge being provided to the first mobile device, where the first present energy charge is realtime energy being provided to the first mobile device by the charging system, and adjusting the second energy charge based at least in part on the first present energy charge.

In example embodiments of the disclosure, there may be a charging system. The charging system may include at least one memory that store computer-executable instructions and at least one processor configured to access the at least one memory. The at least one processor may be configured to execute the computer-executable instructions to establish a first wireless connection with a first mobile device, and receive a first power request from the first mobile device, the first power request associated with a first minimum energy charge of the first mobile device. The processor may be configured to determine an available charging capacity of the charging system, determine, based at least in part on the first power request and the available charging capacity, a first energy charge to provide wirelessly to the first mobile device, and provide energy wirelessly to the first mobile device. The processor may be configured to establish a second wireless connection with a second mobile device, receive a second power request from the second mobile device, the second power request associated with a second minimum energy charge of the second mobile device, and determine an updated available charging capacity of the charging system, based at least in part on the first energy charge. The processor may be configured to determine, based at least in part on the first power request, the second power request, and the updated available charging capacity, a second energy charge to provide wirelessly to the second mobile device, and provide energy wirelessly to the second mobile device. In some examples, the processor may be configured to receive a third power request from the first mobile device, the third power request associated with a first maximum energy charge of the first mobile device, where the second energy charge provided wirelessly to the second mobile device is based at least in part on the first power request, the second power request, the updated available charging capacity, and the third power request.

The processor may also be configured to establish a third wireless connection with a third mobile device, receive a fourth power request from the third mobile device, the fourth power request associated with a third minimum energy charge of the third mobile device, determine an updated available charging capacity of the charging system, based at least in part on the first energy charge and the second energy charge, and determine, based at least in part on the first power request, the second power request, the updated available charging capacity, and the fourth power request, a third energy charge to provide wirelessly to the third mobile device. In some examples, the processor may be configured to receive a fifth power request from the first mobile device, wherein the fifth power request is associated with an energy charge different than the first energy charge, determine an updated available charging capacity of the charging system, based at least in part on the first energy charge and the second energy charge, and determine, based at least in part on the fifth power request, and the updated available charging capacity, a fourth energy charge to provide wirelessly to the first mobile device. In some embodiments, the processor may be configured to request a received energy charge indicator from any mobile device wirelessly connected to the charging system, the received energy charge indicator associated with energy charge received by the mobile device from the charging system, wherein either the first energy charge or the second energy charge is based at least in part on received energy charge indicators received by the charging system. In some embodiments, the processor may be configured to transmit a request for a charge indicator to any mobile device wirelessly connected to the charging system, the charge indicator comprising one of: a percentage charge completion, an estimated time to charge completion, or a charge cycle indication, wherein the at least one processor is further configured to adjust one of the first energy charge or the second energy charge based at least in part on charge indicators received by the charging system. The request for the charge indicator may be transmitted periodically at predetermined time intervals. The processor may be configured to determine a first present energy charge be provided to the first mobile device, where the first present energy charge is realtime energy be provided to the first mobile device, and adjust the second energy charge based at least in part on the first present energy charge.

In example embodiments of the disclosure, there may be a power distribution apparatus. The power distribution apparatus may include a power supply, a power distribution device configured to provide energy wirelessly, at least one memory that stores computer-executable instructions and at least one processor configured to access the at least one memory. The at least one processor may be configured to execute the computer-executable instructions to establish a first wireless connection with a first mobile device, and receive a first power request from the first mobile device, the first power request associated with a first minimum energy charge of the first mobile device. The processor may be configured to determine an available charging capacity of the charging system, determine, based at least in part on the first power request and the available charging capacity, a first energy charge to provide wirelessly to the first mobile device, and provide energy wirelessly to the first mobile device. The processor may be configured to establish a second wireless connection with a second mobile device, receive a second power request from the second mobile device, the second power request associated with a second minimum energy charge of the second mobile device, and determine an updated available charging capacity of the charging system, based at least in part on the first energy charge. The processor may be configured to determine, based at least in part on the first power request, the second power request, and the updated available charging capacity, a second energy charge to provide wirelessly to the second mobile device, and provide energy wirelessly to the second mobile device. In some examples, the processor may be configured to receive a third power request from the first mobile device, the third power request associated with a first maximum energy charge of the first mobile device, where the second energy charge provided wirelessly to the second mobile device is based at least in part on the first power request, the second power request, the updated available charging capacity, and the third power request.

The processor may also be configured to establish a third wireless connection with a third mobile device, receive a fourth power request from the third mobile device, the fourth power request associated with a third minimum energy charge of the third mobile device, determine an updated available charging capacity of the charging system, based at least in part on the first energy charge and the second energy charge, and determine, based at least in part on the first power request, the second power request, the updated available charging capacity, and the fourth power request, a third energy charge to provide wirelessly to the third mobile device. In some examples, the processor may be configured to receive a fifth power request from the first mobile device, wherein the fifth power request is associated with an energy charge different than the first energy charge, determine an updated available charging capacity of the charging system, based at least in part on the first energy charge and the second energy charge, and determine, based at least in part on the fifth power request, and the updated available charging capacity, a fourth energy charge to provide wirelessly to the first mobile device. In some embodiments, the processor may be configured to request a received energy charge indicator from any mobile device wirelessly connected to the charging system, the received energy charge indicator associated with energy charge received by the mobile device from the charging system, wherein either the first energy charge or the second energy charge is based at least in part on received energy charge indicators received by the charging system. In some embodiments, the processor may be configured to transmit a request for a charge indicator to any mobile device wirelessly connected to the charging system, the charge indicator comprising one of: a percentage charge completion, an estimated time to charge completion, or a charge cycle indication, wherein the at least one processor is further configured to adjust one of the first energy charge or the second energy charge based at least in part on charge indicators received by the charging system. The request for the charge indicator may be transmitted periodically at predetermined time intervals. The processor may be configured to determine a first present energy charge be provided to the first mobile device, where the first present energy charge is realtime energy be provided to the first mobile device, and adjust the second energy charge based at least in part on the first present energy charge.

The claimed invention is:

1. A wireless power transmission unit (PTU) for providing wireless power charging signals to multiple wireless power receiving units (PRUs), the PTU comprising:
   a resonator to provide wireless power to first and second PRUs;
   a communications radio for wirelessly communicating with the first and second PRUs;
   wherein the PTU is to
      provide charging power to the first PRU;
      receive a request through the communications radio to provide charging power to the second PRU;
      determine if the PTU has capacity to provide the requested charging power to the second PRU in addition to the current charging power of the first PRU;
      if the PTU does not have the capacity, adjust power being provided to the first PRU or provide less than the requested power to the second PRU so that the power may be provided to both the first and second PRUs.

2. The PTU of claim 1, wherein the communications radio uses a Bluetooth Low Energy (BLE) link to communicate with the at least a first PRU.

3. The PTU of claim 1, wherein the communications radio uses a Near Field Communications link to communicate with the at least a first PRU.

4. The PTU of claim 1, further comprising a processor coupled to the communications radio to control the communications.

5. A method of wireless charging by a first power transmitting unit (PTU), comprising:
   providing charging power to a first power receiving unit (PRU);
   receiving a request through a communications radio to provide charging power to a second PRU;
   determining if the PTU has capacity to provide the requested charging power to the second PRU in addition to the current charging power of the first PRU;
   if the PTU does not have the capacity, adjusting power being provided to the first PRU or providing less than the requested power to the second PRU so that the power may be provided to both the first and second PRUs.

6. The method of claim 5, comprising communicating through the communications radio over a Bluetooth Low Energy (BLE) communications link.

7. The method of claim 5, comprising communicating through the communications radio over a Near Field Communications link.

8. A non-transitory storage medium containing instructions, which when executed, cause performance of operations comprising:
- providing charging power to a first power receiving unit (PRU);
- receiving a request through a communications radio to provide charging power to a second PRU;
- determining if a capacity to provide the requested charging power to the second PRU in addition to the current charging power of the first PRU is sufficient;
- if the capacity is not sufficient, adjusting power being provided to the first PRU or providing less than the requested power to the second PRU so that the power may be provided to both the first and second PRUs.

9. The medium of claim 8, wherein the operations further comprise communicating through the communications radio over a Bluetooth Low Energy (BLE) communications link.

10. The medium of claim 8, wherein the operations further comprise communicating through the communications radio over a Near field Communications (NFC) link.

* * * * *